(12) United States Patent
Ide

(10) Patent No.: US 7,641,260 B2
(45) Date of Patent: Jan. 5, 2010

(54) POWER SUPPLY APPARATUS FOR SLIDING DOOR

(75) Inventor: Takehisa Ide, Sakura (JP)

(73) Assignee: Fujikura Ltd., Tokyo (JP)

( * ) Notice: Subject to any disclaimer, the term of this patent is extended or adjusted under 35 U.S.C. 154(b) by 400 days.

(21) Appl. No.: 11/386,760

(22) Filed: Mar. 23, 2006

(65) Prior Publication Data

US 2006/0219711 A1   Oct. 5, 2006

(30) Foreign Application Priority Data

Mar. 29, 2005  (JP)  ............................. 2005-095383
May 13, 2005  (JP)  ............................. 2005-141560

(51) Int. Cl.
*B60J 5/06* (2006.01)

(52) U.S. Cl. ..................................... 296/155

(58) Field of Classification Search .................. 296/155
See application file for complete search history.

(56) References Cited

U.S. PATENT DOCUMENTS 3,433,889 A   3/1969   De Vries, Jr.

6,492,592 B1   12/2002   Murofushi et al.
6,494,523 B2   12/2002   Kobayashi

FOREIGN PATENT DOCUMENTS

| DE | 198 35 579 A1 | 2/2000 |
| EP | 0 282 389 A1 | 9/1988 |
| EP | 1 108 621 A2 | 6/2001 |
| JP | 11-342807 A | 12/1999 |
| JP | 2003-306089 A | 10/2003 |
| JP | 2003-335188 A | 11/2003 |

*Primary Examiner*—Dennis H Pedder
(74) *Attorney, Agent, or Firm*—Sughrue Mion, PLLC

(57) ABSTRACT

A power supply apparatus for a vehicular sliding door is provided, including a power supply line electrically coupled to a power supply; a power supply line protector including a rectangular-shaped case and disposed in the vehicular sliding door, in which the power supply line is housed in a bent state; a power supply line path in the case which controls the bent line; a slider received in, and slidable along, a length of the case; an extension spring by which the slider is urged toward one end side of the case; and a slit-shaped opening in an underside of the case; wherein a side portion of the line is drawn out through the slit-shaped opening and secured to a vehicle body side; and wherein a power supply line portion, which has been drawn out from another end side of the case, is connected to appliances inside the door.

7 Claims, 13 Drawing Sheets

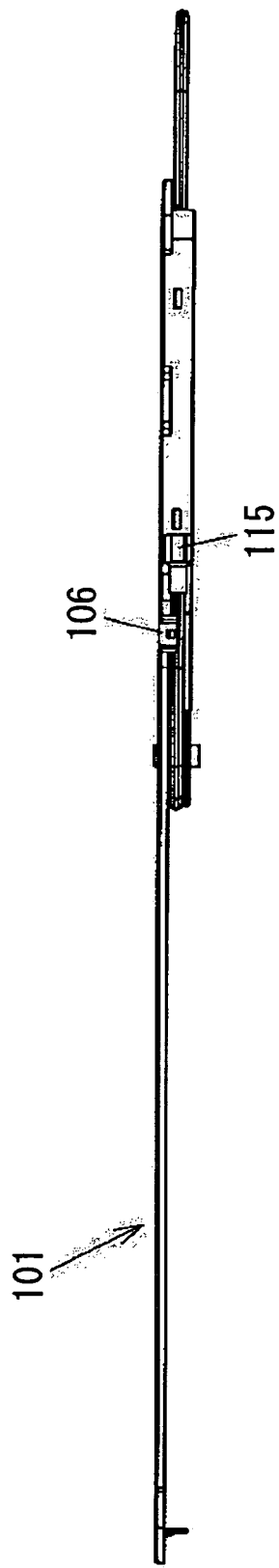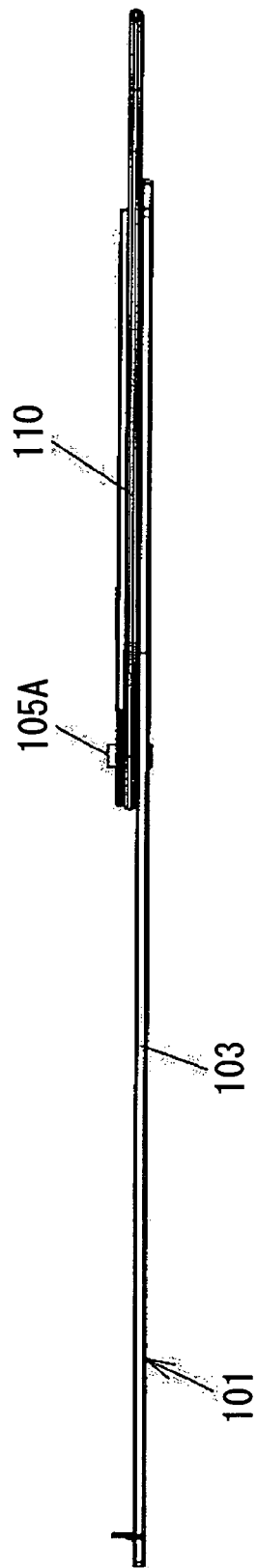

POWER SUPPLY APPARATUS FOR SLIDING DOOR

CROSS-REFERENCE TO RELATED APPLICATIONS

This application is based upon and claims the benefit of priority from Japanese Patent Applications No. 2005-95383, filed Mar. 29, 2005, and No. 2005-141560, filed May 13, 2005, in the Japanese Patent Office, the disclosures of which are incorporated herein in their entirety by reference.

BACKGROUND OF THE INVENTION

1. Field of the Invention

Devices, systems, and methods consistent with the invention relate to a power supply apparatus for a sliding door in a motor vehicle such as a minivan (a so-called one-box car), wherein the sliding door and a vehicle body are electrically coupled to one another via a power supply line in order to regularly supply electrical power to the sliding door.

1. Description of the Related Art

Heretofore, in a sliding door of a motor vehicle such as a minivan, a structure has been known in which a power supply line is laid extending from a vehicle body to the sliding door in order to regularly supply electrical power and electrical signals to devices such as electric appliances in the sliding door. The power supply line is housed in a protector, which is made of plastic and installed in the sliding door, in a manner such that the power supply line is in a bending state inside the protector in order that expansion and contraction of the power supply line due to opening and closing movement of the sliding door can be absorbed or compensated.

For example, a structure in which a protector has a slit-shaped opening along which a flanged guide portion whose longitudinal cross section has a curved-shape or slanted-shape is formed, in which a power supply line guidance portion is formed on the edge of the flanged guide portion, and is gradually curved or slanted in the height-wise direction, and in which an opening portion for leading out a power supply line is formed adjacent to the power supply line guidance portion such that it is connected to the slit-shaped opening is known from Japanese Unexamined Patent Application, First Publication No. 2003-335188.

With this structure or apparatus, when a protector is secured to a sliding door and a power supply line is drawn out through a slit-shaped opening to a vehicle body side, the power supply line oscillates along the flanged guide portion at a time of opening and closing the sliding door, and smoothly climbs from an end of the slit-shaped opening along the power supply line guidance portion. Therefore, if a power supply line stationary portion at a vehicle body side is located at a position higher than the slit-shaped opening, an opening portion for guiding the power supply line has the same level of height as the power supply line stationary portion when the sliding door is, for example, fully closed. The power supply line is never folded in a U-turn manner with a small diameter in the vertical direction, and therefore, application of excessive bending force to the power supply line can be avoided.

Further, when the sliding door is opened, the power supply line is caught by the power supply line guidance portion and smoothly guided by the flanged guide portion without being tangled. At the same time, the power supply line being drawn out through the slit-shaped opening is rendered curved or slanted and then smoothly bent in the height-wise direction. When the sliding door is fully closed, the sliding door is substantially outwardly separated from the vehicle body. Thus, a bending radius along the flanged guide portion becomes large such that application of excessive bending force to the power supply line can be avoided.

One conventional protector is formed relatively large in a snail-shape in order to prevent the power supply line from being repeatedly bent with a small diameter in a U-turn manner. Namely, the protector is relative large to form such a snail-shape. If such large protectors are used for production, disadvantages in terms of production costs are generated. In addition thereto, since such a large protector is incorporated inside the sliding door, the locations on which other appliances can be provided are limited, thus resulting in poor design in terms of the layout inside the door.

SUMMARY OF THE INVENTION

In consideration of the above circumstances, an aspect of the present invention is to provide a power supply apparatus for a sliding door, enabling down-sizing, avoiding the detrimental influence caused by repeated bending, and easing a design of components layout inside the door.

In accordance with a first aspect of the present invention, there is provided a power supply apparatus for a vehicular sliding door, the apparatus including a power supply line which is electrically connected to a power supply to supply electrical power to electrical appliances inside the sliding door; a power supply line protector which includes a rectangular-shaped case and is disposed in the sliding door and in which the power supply line is housed in a bent state; a power supply line path which is provided in the case of the power supply line protector and which controls the bent state of the power supply line; a slider which is received in, and slidable along a length of, the case; an extension spring by which the slider is normally urged toward one end side of the case; and a slit-shaped opening which is formed in an underside of the case and which covers a range of sliding of the slider; wherein a power supply side portion of the power supply line is drawn out through the opening of the case and then secured to a vehicle body side; and wherein a power supply line portion, which has been drawn out from another end side of the case, is connected to electrical appliances inside the sliding door.

The slider may include a distal end member along the contour of which the power supply line is bent so that a power supply line portion from a power supply line path side to an upper side thereof is curved; a base end member to which the extension spring is connected; and a connecting member through which the distal end member and the base end member are connected.

The power supply line in the case may be inserted in a sheath member.

The extension spring may consist of a coil spring bent in a U-shape.

The power supply line protector may be integrally formed with a module plate into which appliances to be disposed in the sliding door are incorporated.

In accordance with a second aspect of the present invention, there is provided a power supply apparatus for a vehicular sliding door, the apparatus including a power supply line which is electrically connected to a power supply to supply electrical power to electrical appliances inside the sliding door; a power supply line protector which includes a rectangular-shaped case and is disposed in the sliding door and in which the power supply line is housed in a bent state; a compression spring a base end of which is secured to one end side of the inside of the case; and a roller which is disposed at a front end of the compression spring and which rolls within the case, the periphery of the roller being round; wherein the power supply line is extracted through the one end side of the case and through an opening of the case and then connected to the power supply, a partway portion of the power supply line being traversed over the roller in the case; wherein when the sliding door is in an opened state, the partway portion of the power supply line is extracted out of the case and the compression spring is compressed by the roller; and wherein the roller is pushed back due to a restoring force of the compression spring in response to sliding or closing movement of the sliding door.

The compression spring may consist of a plate spring bent in a zigzag manner.

As described above, if a module plate and a protector have been previously formed integrally with one another, installation operation for the inside of a door would further be expedited.

The above and other aspects of the present invention will become apparent upon consideration of the following detailed description of exemplary embodiments thereof, particularly when taken in conjunction with the accompanying drawings wherein like reference numerals in the various figures are utilized to designate like components.

BRIEF DESCRIPTION OF THE DRAWINGS

The above and other aspects of the invention will become more apparent by describing in detail exemplary embodiments thereof with reference to the attached drawings in which:

FIG. 11 is a plan view of the power supply line protector.

FIG. 12 is a bottom plan view of the power supply line protector.

DETAILED DESCRIPTION OF THE INVENTION

Exemplary embodiments of the invention will now be described below by reference to the attached Figures. The described exemplary embodiments are intended to assist the understanding of the invention, and are not intended to limit the scope of the invention in any way.

Hereinafter, a first exemplary embodiment of a power supply apparatus for a sliding door in a motor vehicle according to the invention will be described with reference to FIGS. 1 through 8.

Figure 1:
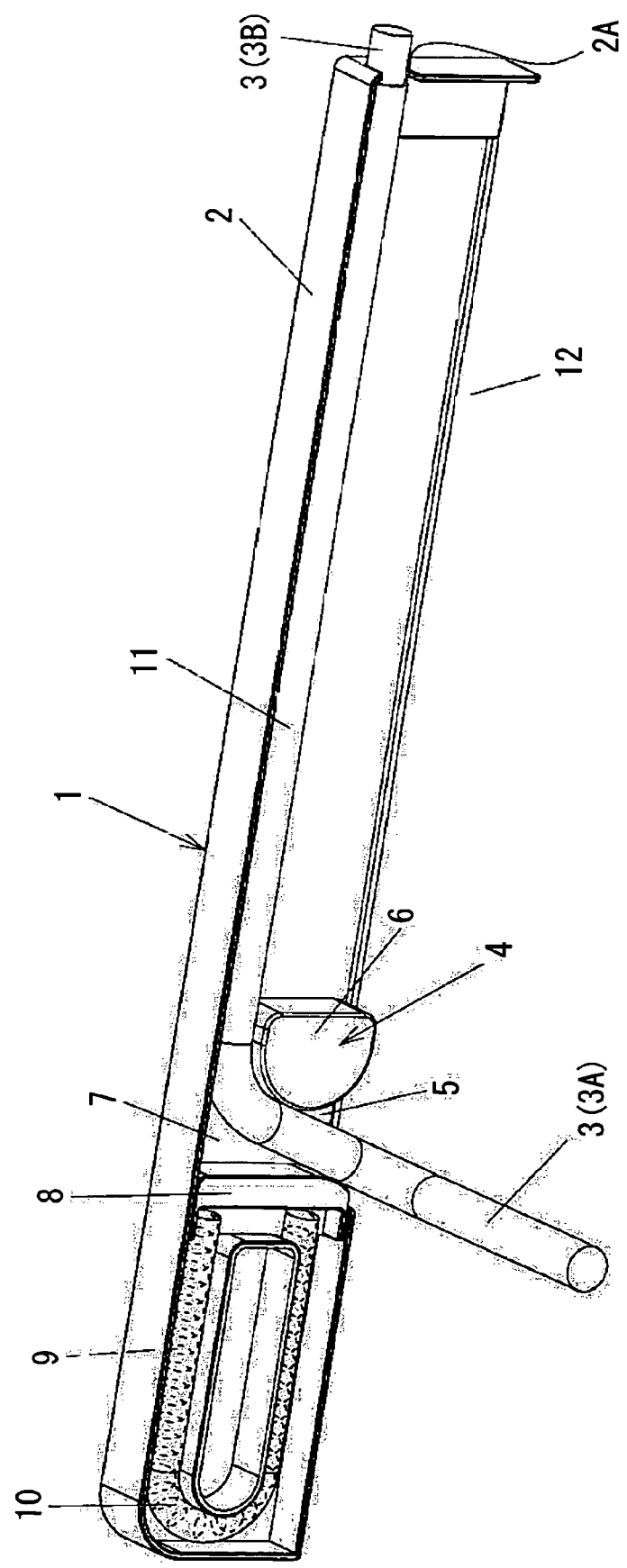
FIG. 1 is a perspective view illustrating portions of a first embodiment of the present invention.

As shown in FIG. 1, a power supply line protector 1 includes a rectangular-shaped case 2 inside of which a power supply line 3 is housed in a curved or bent state to supply electrical power to electric appliances in the sliding door. A power supply line path 5 is provided in the case 2 to control bending of the power supply line 3. A slider 4 is provided in the case 2 so as to slide along a lengthwise direction of the case 2. The slider 4 is comprised of a distal end member 6 having a rounded portion, a connecting member 7, and a base end member 8 that is connected to the distal end member 6 through the connecting member 7. The power supply line 3 is guided by and curved along a surface (the contour) from a power supply path side to an upper side of the rounded portion of the distal end member 6. The aforementioned connecting member 7 is a thin plate-shaped member and enables a sliding operation of the slider 4 in the case 2. More specifically, the connecting member 7 of the slider 4 has upper and lower ends, which are fitted in respective rails or recesses (not shown in the drawings) such that the slider 4 is slidable along the rails. The slider 4 is connected to an extension spring 9, which normally urges the slider 4 toward one end side of the case 2. This extension spring 9 is inserted in a U-shaped protective case 10 such that a coil spring constituting the extension spring 9 is generally curved so as to present a U-shaped configuration. This extension spring 9 has ends both of which are fixedly connected to the base end member 8 of the slider 4 such that the slider 4 is normally urged in a leftward direction in FIG. 1. In the case 2, the power supply line 3 is inserted in a sheath member 11 for protection thereof. As the sheath member 11, a corrugated tube made of plastic resin, or other suitable material known in the art, can advantageously be used. One end of the power supply line 3 or a portion 3A which is drawn out from the power supply line path 5 through a below-mentioned opening 12 is fixed to a vehicle body for electrical connection to a power supply. Another portion 3B (or another end of the power supply line 3), which is drawn out through an opening 2A of another end of the case 2, is connected to appliances inside the sliding door. A slit-shaped opening 12 whose dimension corresponds to a sliding length of the slider 4 is provided on the underside of the case 2. The supply line 3 is moved or slid along the opening 12 while penetrating therethrough.

Figure 2:
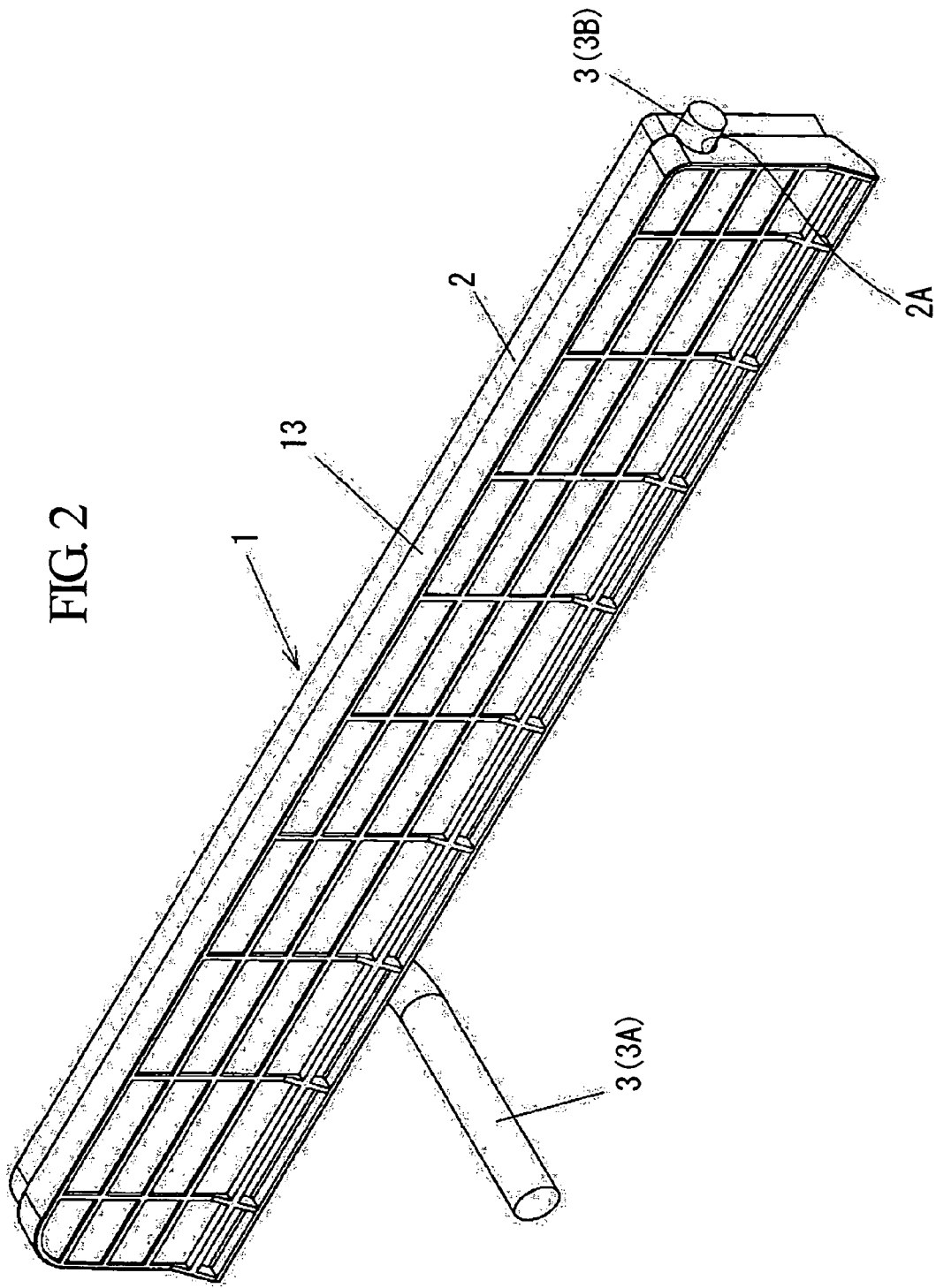
FIG. 2 is a perspective view of the portions shown in FIG. 1, with a cover secured thereto.

FIG. 2 illustrates a state in which a cover 13 is secured to one side surface of the case 2 of FIG. 1. As already described, in the state in which the side surface of the case 2 is covered with the cover 13, the power supply line 3 is drawn out through the opening 2A of the aforesaid another end of the case 2 and then connected to the appliances inside the sliding door. The power supply line 3 is also drawn out through the opening 12 via the power supply line path 5 and then fixed to the vehicle body (not shown) for electrical connection to the power supply.

Figure 3:
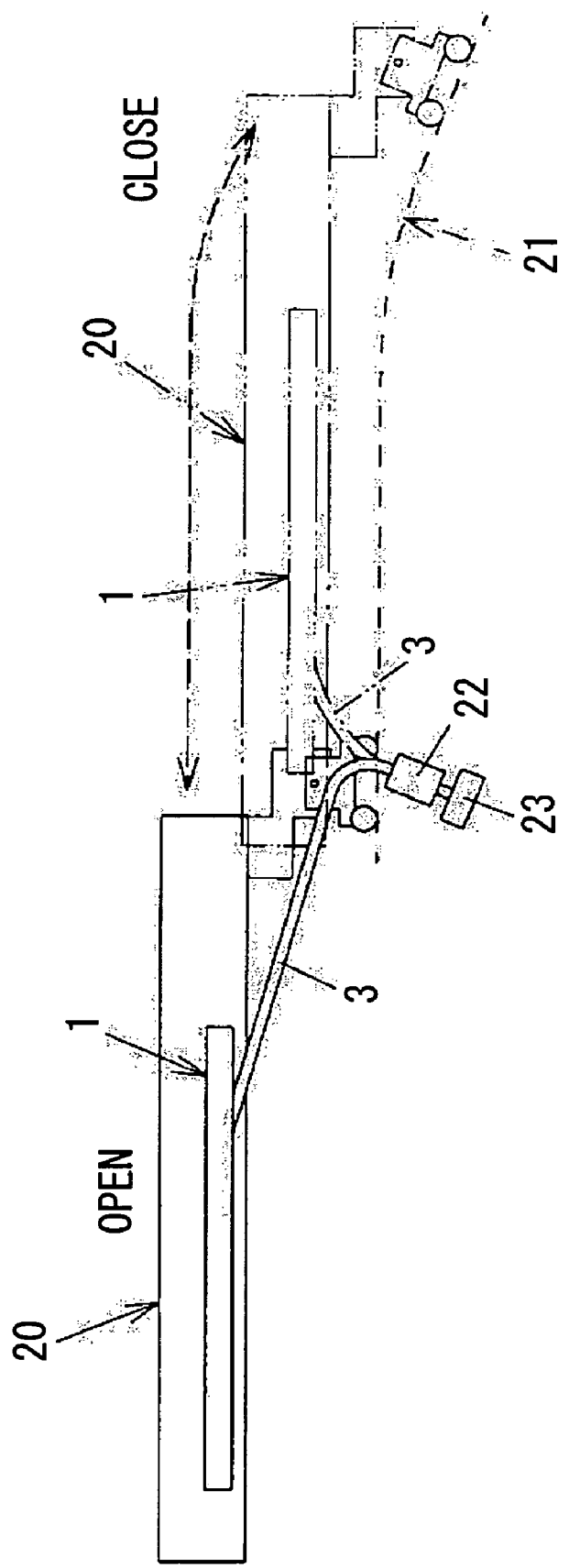
FIG. 3 is a simplified view to explain operation of a power supply line protector when a sliding door is opened and closed.

FIG. 3 is a view to explain operation of the apparatus of the present exemplary embodiment when a sliding door 20 is opened and closed. The power supply line 3 is secured to the vehicle body, and more specifically to a stepped portion thereof, and has a connector 23 at its leading end. The connector 23 is connected to a wire harness which is extended from the power supply. When the sliding door 20 is positioned at a right side in FIG. 3, it is in a closed state. When the sliding door 20 is opened or slid leftward as indicated by an arrow on a dash-dot line, the slider 4 is pulled leftward against a tensioning force of the extension spring 9 in response to a sliding of the sliding door 20.

The fact that the power supply line 3 is secured to a vehicle body 21 by a stationary portion 22 is part of the reason that the slider 4 is slid. When the sliding door 20 has reached a left side position of FIG. 3, it is in a fully open state. A length of the power supply line 3 which extends from the stationary portion 22 to the power supply line protector 1 becomes long.

Figure 4:
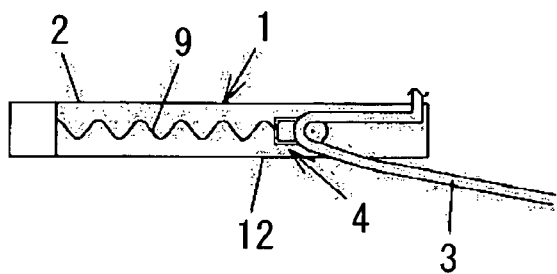
FIG. 4 is a simplified view illustrating the inside of the power supply line protector in a state in which the sliding door is open.
Figure 5:
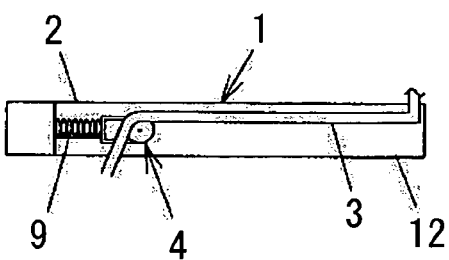
FIG. 5 is a simplified view illustrating the inside of the power supply line protector in a state in which the sliding door is closed.
Figure 6:
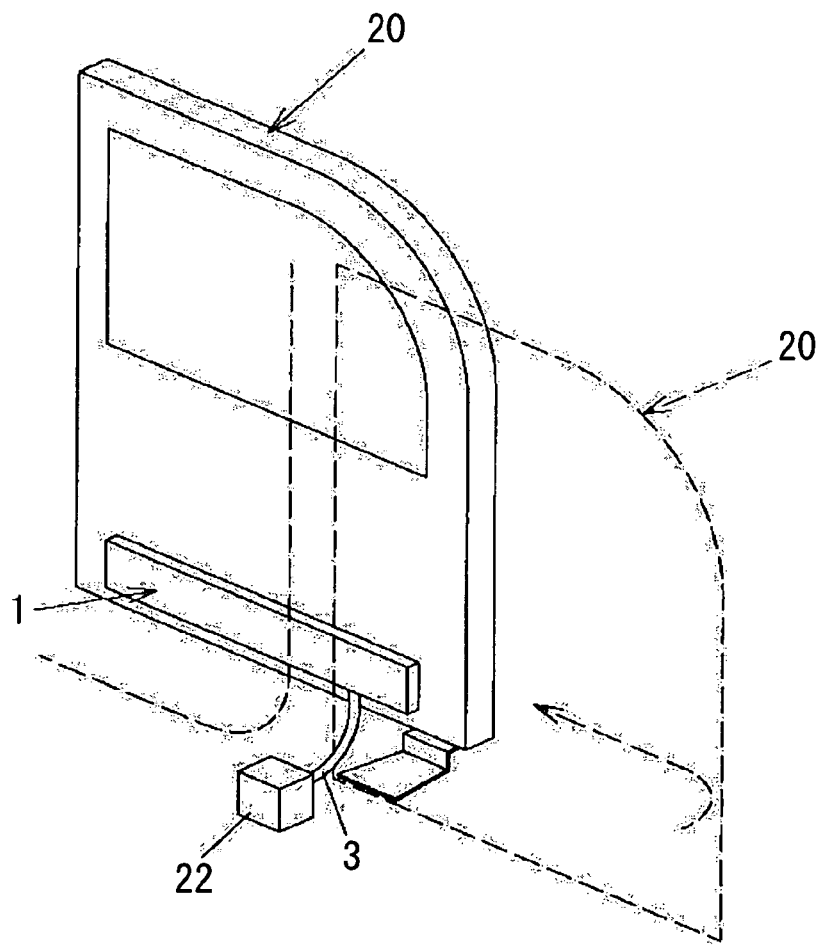
FIG. 6 is a diagrammatically schematic view illustrating a relationship between the power supply line protector and sliding movement of the sliding door.

FIG. 4 illustrates a simplified inner structure of the power supply line protector 1 when the sliding door 20 is in a open state, or occupies a position shown at a left side in FIG. 3. Further, FIG. 5 illustrates the simplified inner structure of the power supply protector 1 when the sliding door 20 is in a fully closed state. In the fully opened state, the power supply line 3 in the case 2 is drawn out through the opening 12 lengthily to the outside. In the fully closed state, a greater part of the power supply line 3 is received in the case 2. FIG. 6 is a view to explain a general concept of the sliding door 20 being slid from a closed state to an opened state.

Figure 7:
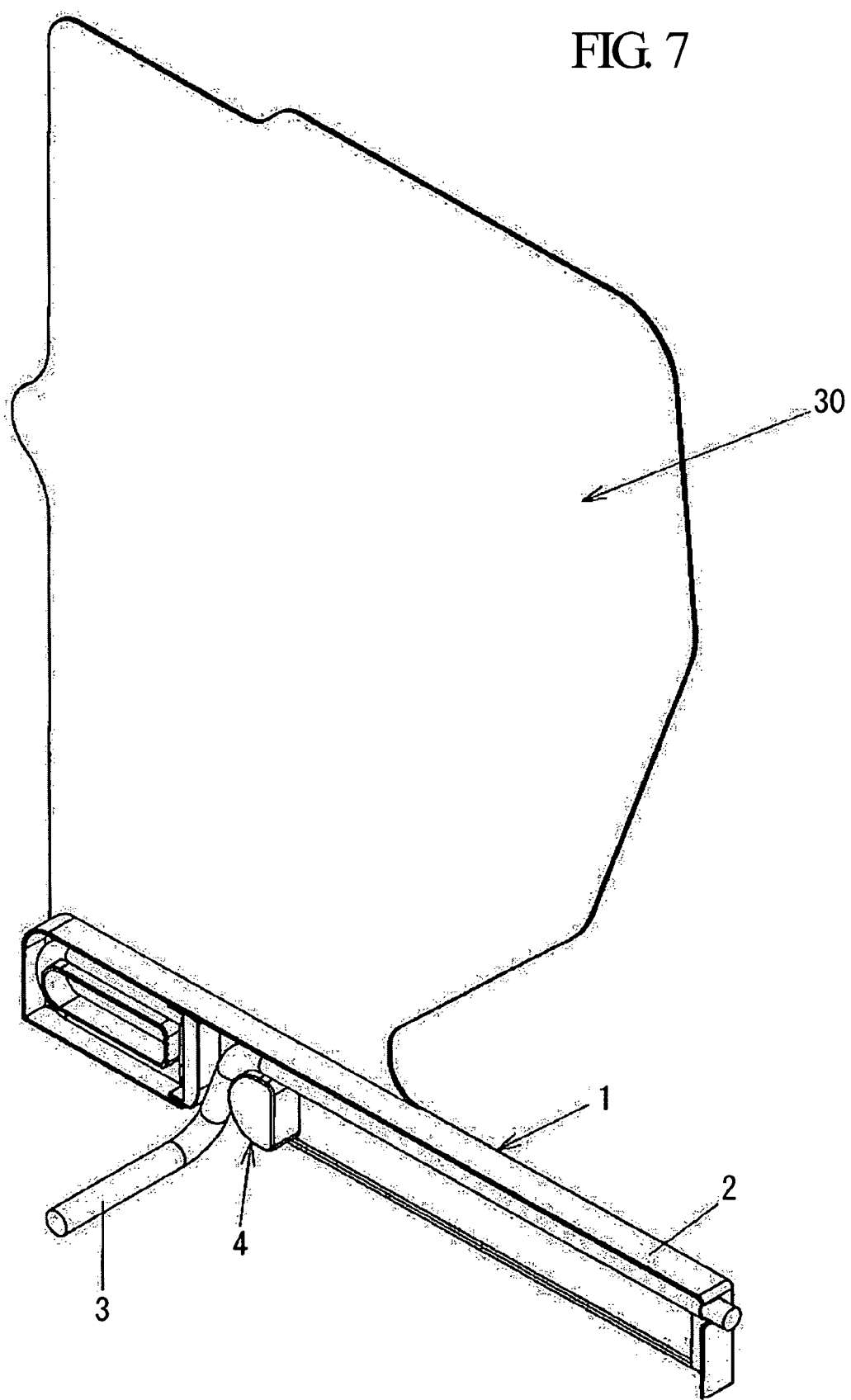
FIG. 7 is a perspective view illustrating a case formed integrally with a module plate.
Figure 8:
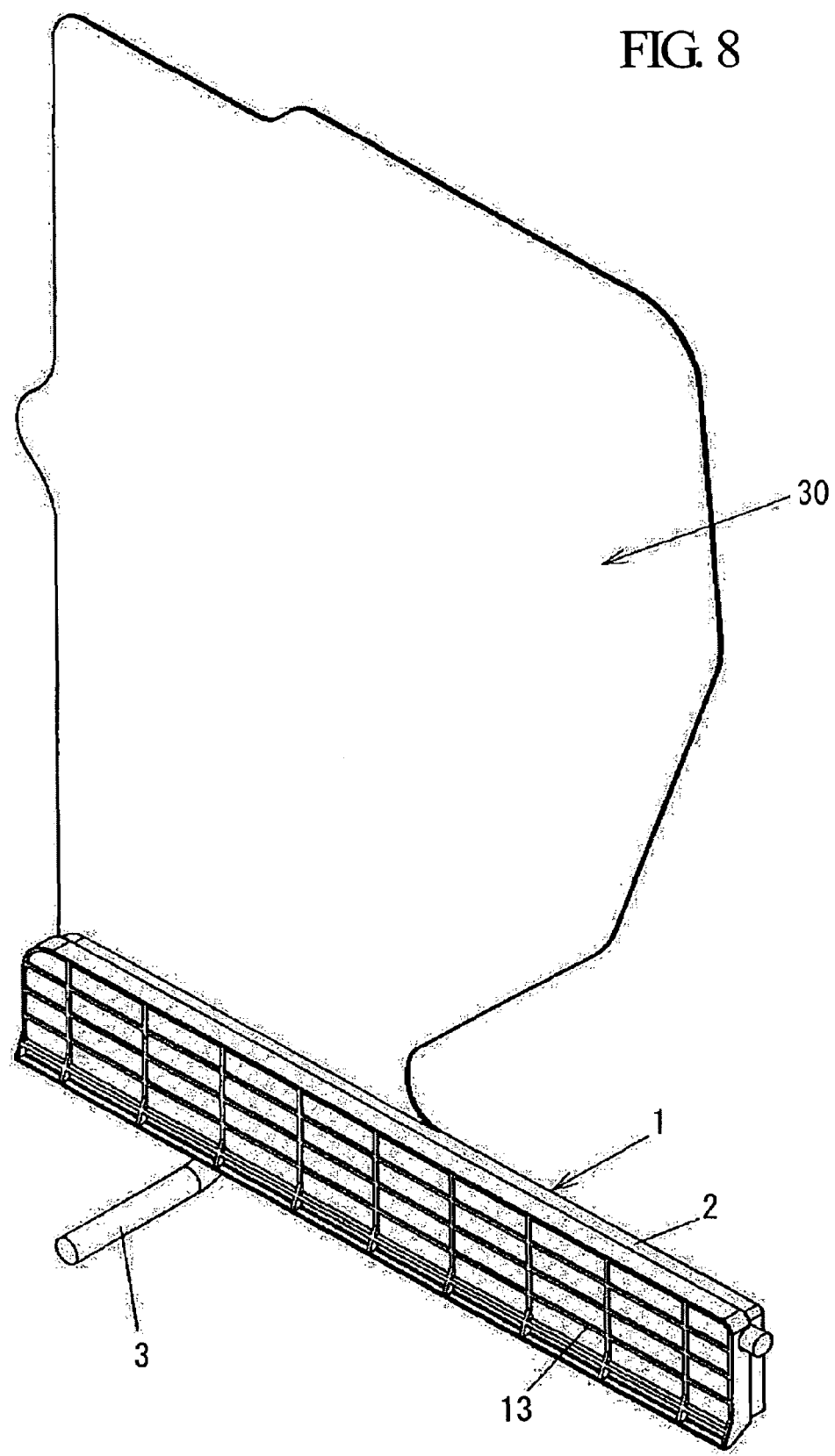
FIG. 8 is a perspective view illustrating the case of FIG. 7, with the cover secured thereto.

As seen from FIGS. 4 and 5, the power supply line 3 is fixed to the vehicle body 21 by the stationary portion 22 at one end side (or the portion 3A) of the power supply line 3. The power supply line 3 is positioned such that it follows the contour of the distal end member 6 of the slider 4. The case 2 (the power supply protector 1) is slid along with the sliding door 20, and therefore, the power supply line 3 causes the slide 4 to move. As the power supply line 3, it is advantageous to use a wire harness having a circular cross-section rather than a wire harness having a flat shape, in terms of strength. Further, the sheath member 11 is advantageously formed in a cylindrical shape. FIGS. 7 and 8 illustrate a module plate 30 and the case 2, both of which are integrally formed with one another and made of synthetic resin, the latter figure illustrating a state in which the cover 13 is secured to one side thereof.

Recently, in motor-vehicle manufacturing companies, with the aim of improving the ease of assembly, reducing costs by parts integration, and reducing weight, door modules have been adopted. A typical door module is structured by a module plate and by parts, i.e., a power window in a door, an actuator for self-locking, a regulator, and other parts known in the art, mounted on the module plate, wherein the module plate with the parts mounted thereon is installed in an opening formed in an inner panel of the door at the same time as one unit. When applying an apparatus according to exemplary embodiments of the present invention to a vehicle employing such a door module, a structure is formed in which a module plate and a case are injection-molded to be integrally formed with one another and in which a regular power supply line protector is integrated with a door module.

Next, a second exemplary embodiment according to the present invention will be described hereinafter with reference to FIGS. 9 through 16.

Figure 9:
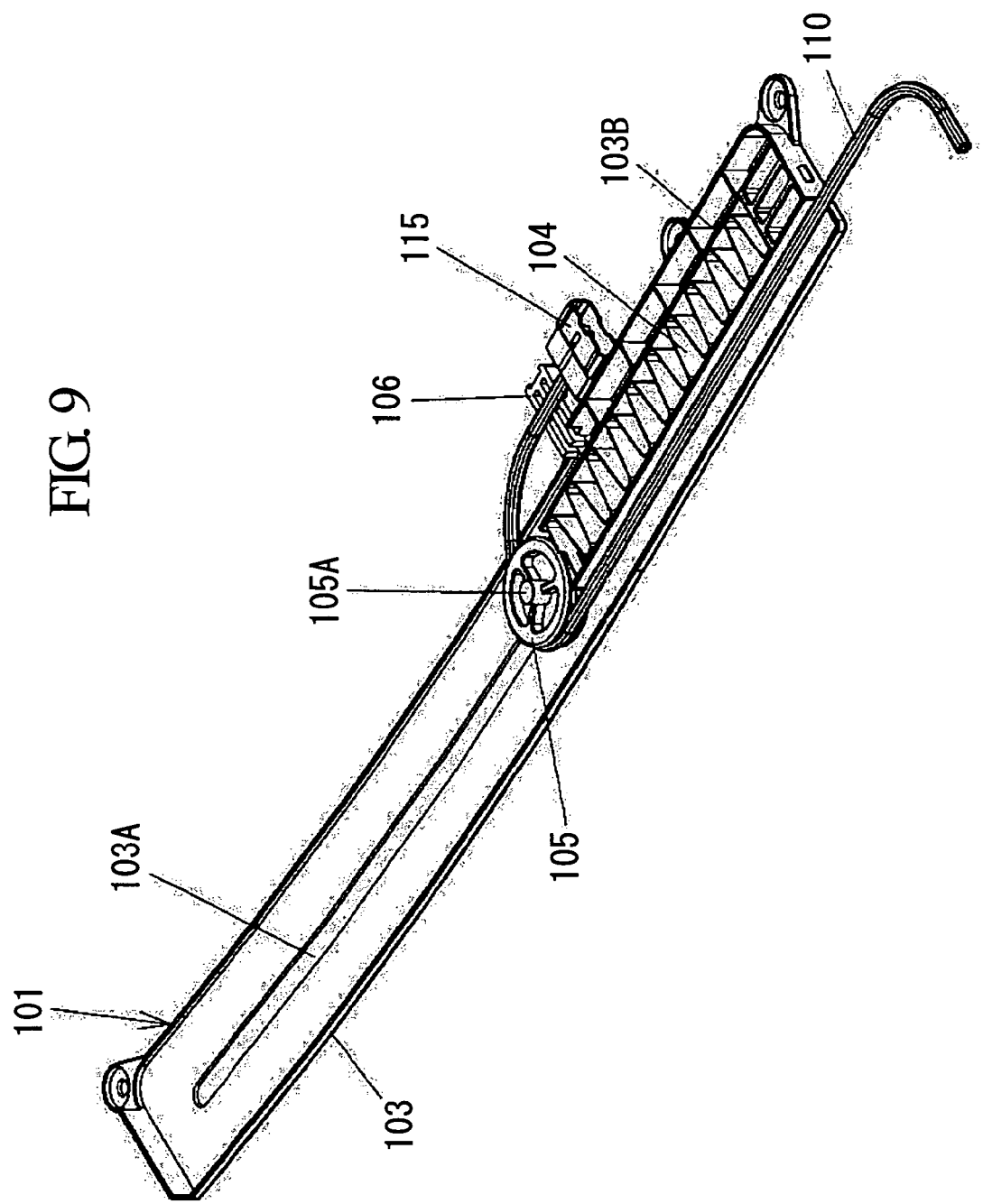
FIG. 9 is a perspective view illustrating a power supply line protector of a second embodiment prior to securing an upper case thereto.
Figure 10:
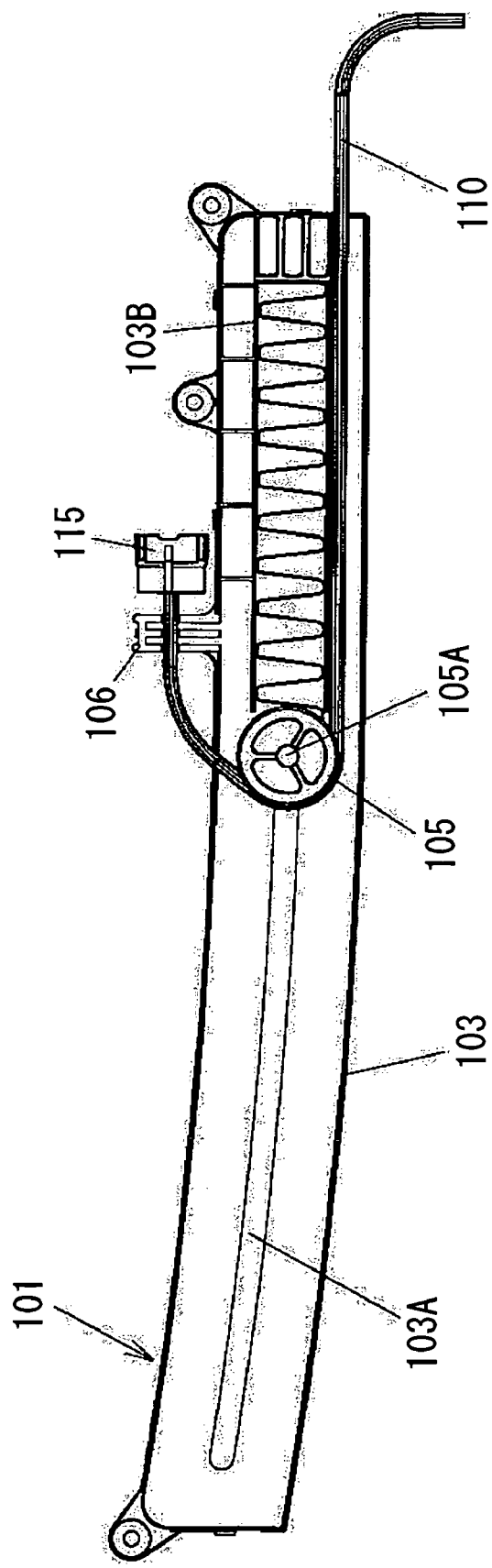
FIG. 10 is a front elevation view of the power supply line protector.
Figure 13:
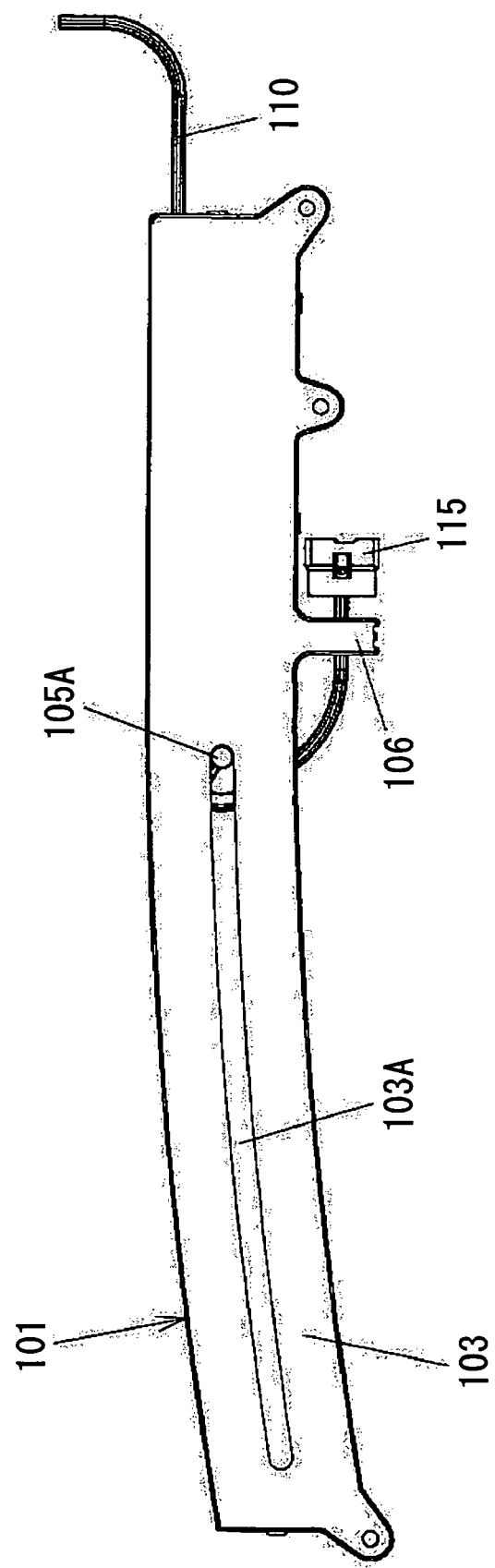
FIG. 13 is a rear side elevation view of the power supply line protector.

FIG. 9 is a perspective view illustrating a power supply line protector 101 to be incorporated in a vehicle body, without an upper case 102 (see FIG. 11). A compression spring 104 is secured to one end of a lower case 103 (referred to simply as a "case") at a base end thereof. A circumferentially circular roller 105 is disposed at a leading end of the compression spring 104 and rolls inside the lower case 103. An illustrated groove is formed on the periphery of the roller 105 so as to present a pulley wheel, along, or in which, a power supply line 110 can run. One end of the power supply line 110, which has been drawn out of a right end, in FIG. 9, of the lower case 103, is connected to an appliance (not shown) in a sliding door 111, whereas the other end of the power supply line 110 is drawn out at a lengthwise directional side of an opening, and then, connected to a power supply.

Figure 14:
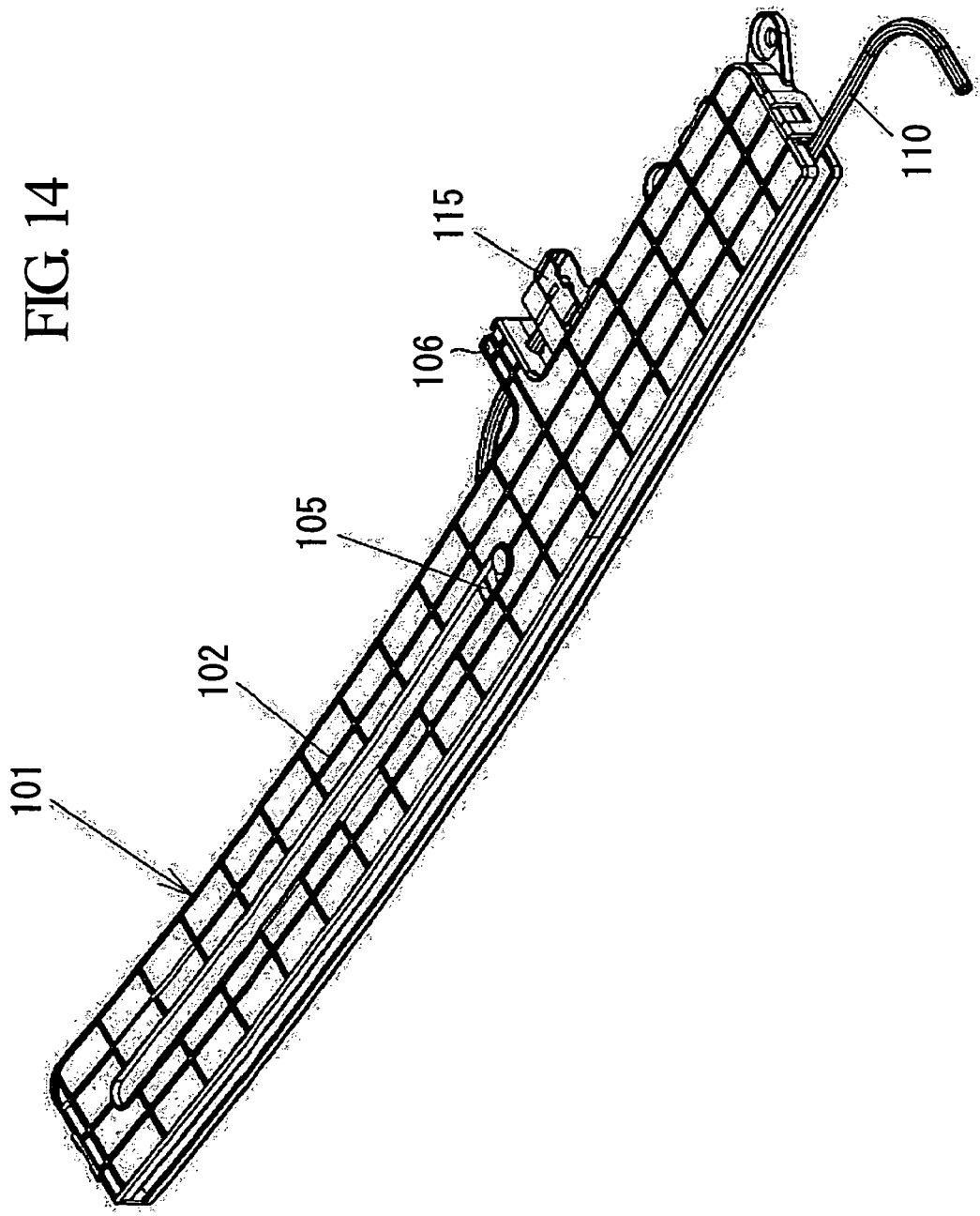
FIG. 14 is a perspective view illustrating the power supply line protector after securing the upper case thereto.

FIGS. 10, 11, 12, and 13 are a front elevation view, plan view, bottom view, and rear side elevation view, respectively. In the lower case 103 is formed a long hole 103A, through which a central axis 105A of the roller 105 is inserted, such that the roller 105 is moved along the long hole 103A while rotating. Further, a stationary portion 106 is formed in an upper side of the opening of the lower case 103. The power supply line 110 is secured to the stationary portion 106 (one of portions marked by "X" in FIGS. 15 and 16). Further, in the lower case 103 is formed a frame member 103B in which the compression spring 104 is housed to thereby maintain accuracy during a telescopic motion of the compression spring 104. The compression spring 104 may be a plate spring or other similar spring known in the art. The compression spring 104 is made of metal, whereas the lower case 103 and the roller 105 are made of synthetic resin, or other such substance known in the art. FIG. 14 is a perspective view illustrating the lower case 103 with the upper case 102 secured in a cap manner thereto. The stationary portion 106 for holding the power supply line 110 is formed of the upper case 102 and the lower case 103. The state illustrated in FIGS. 9 through 14 is a state in which the sliding door 111 is in a fully opened state and in which the compression spring 104 is compressed to the full extent by the roller 105. A force that urges the roller 105 with respect to the compression spring 104 is a pulling force developed by the power supply line 110 pulling the roller 105 toward the one end thereof.

Figure 15:
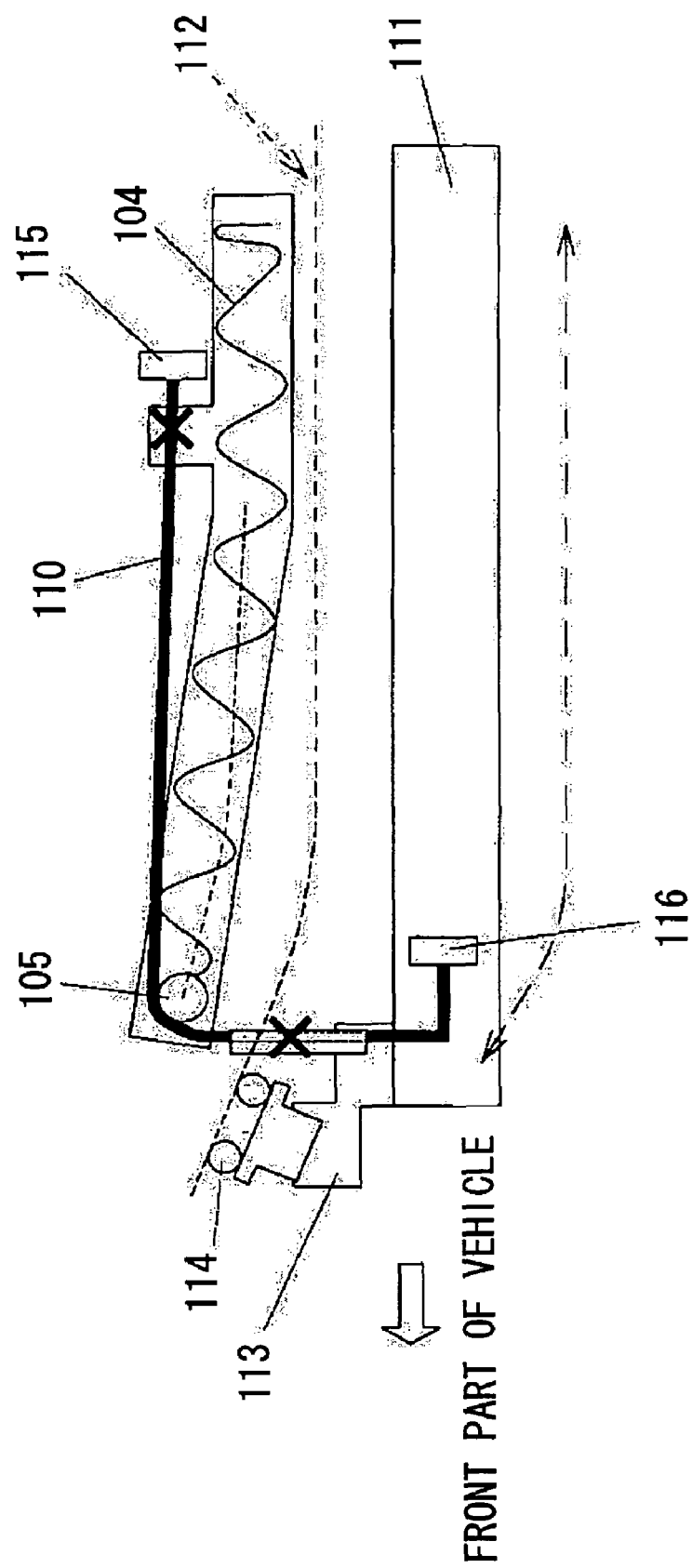
FIG. 15 is a view to explain the sliding door in a closed state.

FIG. 15 is a view to explain the sliding door 111 being in a fully closed state. In the Figure, illustration of the upper case 102 and the lower case 103 is omitted, in view of the ease of understanding movements of the roller 105 and the compression spring 104. It is a state in which the compression spring 104 is expanded such that the roller 105 is pressed onto the other end side of the inside of the case 103, and an amount or length by which the power supply line 110 has been drawn out at a sliding door 111 side of the case 103 is small. The power supply line protector 101, which encloses the compression spring 104 and the roller 105, is disposed underneath a doorstep 112 of the vehicle body. In the figures, portions marked by "X" indicate portions at which the power supply line 110 has been secured or fixed. Further, rollers 114 are secured to the sliding door 111 through a door arm 113 and run on a side surface of the doorstep 112.

Figure 16:
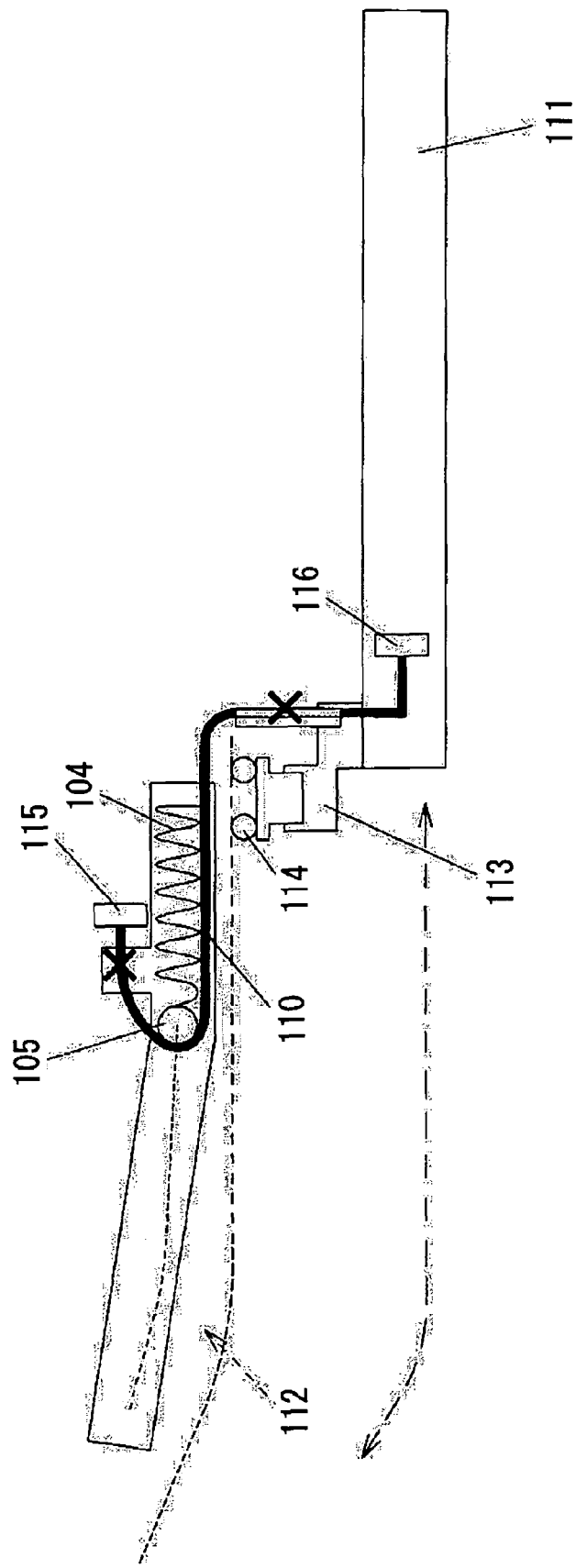
FIG. 16 is a view to explain the sliding door in an opened state.

FIG. 16 is a view illustrating the sliding door 111 being in a fully opened state. The one end side of the power supply line 110 is drawn out of the case 103 in response to sliding movement of the sliding door 111. By the power supply line being drawn out, the roller 105 is moved or runs from left to right (in the figure) to thereby compress the compression spring 104. Incidentally, a reference numeral 115 indicates a connector of a harness extended from the power supply, and a reference numeral 116 indicates a connector of a harness extended from an appliance in the sliding door 111, both connectors being connected to respective ends of the power supply line 110. Moreover, in FIGS. 15 and 16, portions marked by "X" indicate portions at which the power supply line is secured.

The roller 105 maintains a constant bending motion or behavior of the power supply line 110 such that breakage caused by having been bent at an acute angle is prevented. The compression spring 104 returns to an original, or initial position, when the sliding door 111 is closed. When the sliding door 111 is in an opened state, the power supply line portion between the two points ("X" marked portions in FIGS. 15 and 16) urges the compression spring 104 via the roller 105 whereby the compression spring 104 is compressed and received in the frame 103A.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the invention as defined by the following claims.

What is claimed is:

1. A power supply apparatus for a vehicular sliding door, the apparatus comprising:
    a power supply line which is electrically coupled to a power supply to supply electrical power to electrical appliances inside the vehicular sliding door;
    a power supply line protector which includes a case and is disposed in the vehicular sliding door and in which the power supply line is housed in a bent state;
    a power supply line path which is provided in the case and which controls the bent state of the power supply line;
    a slider which is received in, and slidable along, a length of, the case;
    a spring by which the slider is urged toward one end side of the case; and
    a slit-shaped opening which is formed in an underside of the case and which covers a sliding range of the slider, wherein:
    a power supply side portion of the power supply line is drawn out through the slit-shaped opening and secured to a vehicle body side;
    a power supply line portion, which has been drawn out from another end side of the case, is connected to electrical appliances inside the sliding door;
    the slider redirects the power supply line with increasing bending angle thereof as the door moves from closed to open.

2. The power supply apparatus according to claim 1, wherein the slider comprises:
    a distal end member along the contour of which the power supply line is bent so that a power supply line portion from a power supply line path side to an upper side thereof is curved;
    a base end member to which the spring is connected; and
    a connecting member through which the distal end member and the base end member are connected.

3. The power supply apparatus according to claim 1, wherein the power supply line in the case is inserted in a sheath member.

4. The power supply apparatus according to claim 1, wherein the spring consists of a coil spring bent in a U-shape.

5. The power supply apparatus according to claim 1, wherein the power supply line protector is integrally formed with a module plate into which appliances to be disposed in the sliding door are incorporated.

6. A power supply apparatus for a vehicular sliding door, the apparatus comprising:
    a power supply line which is electrically coupled to a power supply to supply electrical power to electrical appliances inside the vehicular sliding door;
    a power supply line protector which includes a case and is disposed in the sliding door and in which the power supply line is housed in a bent state;
    a spring, a base end of which is secured to one end side of an inside of the case; and
    a roller which is disposed at a front end of the spring and which rolls within the case, a periphery of the roller being round;
    wherein the power supply line is extracted through the one end side of the case and through an opening of the case and connected to the power supply, a partway portion of the power supply line being traversed over the roller;
    wherein when the sliding door is in an opened state, the partway portion of the power supply line is extracted out of the case and the spring is compressed by the roller; and
    wherein the roller is pushed back due to a restoring force of the spring in response to a closing movement of the sliding door.

7. The power supply apparatus according to claim 6, wherein the spring is a plate spring bent in a zigzag manner.

* * * * *